United States Patent [19]

Zimmerman

[11] Patent Number: 5,169,279

[45] Date of Patent: Dec. 8, 1992

[54] INTERFACING LIFT HITCH

[76] Inventor: Emil F. Zimmerman, Box 332, Richardton, N. Dak. 58662

[21] Appl. No.: 719,750

[22] Filed: Jun. 24, 1991

Related U.S. Application Data

[62] Division of Ser. No. 364,654, Jun. 9, 1989, Pat. No. 5,026,247.

[51] Int. Cl.⁵ ............................................. B66C 3/00
[52] U.S. Cl. .................................. 414/703; 280/416.2; 403/317; 403/330
[58] Field of Search ............... 414/703; 403/330, 316, 403/317; 280/416.2; 172/272–275

[56] References Cited

U.S. PATENT DOCUMENTS 3,818,551  6/1974  Coughran, Jr. ............... 172/272 X
4,846,624  7/1989  Hohn ........................... 172/275 X
4,929,143  5/1990  Dohnalik ...................... 403/330 X Primary Examiner—Michael S. Huppert
Assistant Examiner—Donald W. Underwood
Attorney, Agent, or Firm—Palmatier & Sjoquist

[57] ABSTRACT

The present disclosure includes an interfacing lift hitch for connection between a tractor and an implement. The hitch includes retractable, implement connecting hooks and is U-shaped to allow operation of the power takeoff of the tractor. The disclosure further includes a drawbar mounting device connectable to the U-shaped lift hitch when the power takeoff is not being operated, and a four point hitch mechanism connected to one of my lift hitches and being operable when the hooks are moved to an out of the way position.

8 Claims, 9 Drawing Sheets

INTERFACING LIFT HITCH

This is a divisional of copending application(s) Ser. No. 364,654 filed on Jun. 9, 1989, which in turn was copending with U.S. patent application Ser. No. 121,344 filed Nov. 16, 1987, now U.S. Pat. No. 4,850,789.

FIELD OF INVENTION

The present invention relates to improvements to an interfacing lift hitch which attaches as an interface between a tractor or front loader and an industrial or farm implement such as a plow.

BACKGROUND OF THE INVENTION

The prior art includes a hitch having three hooks rigidly affixed thereto and disposed in a similar fashion as the points on a conventional three-point hitch. The hitch attaches to the rear end of a tractor and is coupled to the front end of an implement.

SUMMARY OF THE INVENTION

A feature of the present invention is the provision in an interfacing lift hitch having hooks movable to an out of the way position and arranged in a three point orientation, of an inverted U-shaped frame arrangement allowing the operation of the power takeoff of a tractor.

Another feature of the present invention is the provision in such a lift hitch, of a readily lockable and removable hook of the three point hook arrangement.

Another feature of the invention is the provision in such a lift hitch, of a pair of pivoting locking bars for locking the lower hooks of the three point hook arrangement. The locking bars provide rigidity to the hooks in their operating position but allow them to be retracted readily to the out of the way position in the lift hitch.

Another feature of the present invention is a drawbar mounting implement that mounts and carries a drawbar close to the ground. The drawbar mounting device is connectable to a three point hook arrangement.

Another feature of the present invention is a drawbar mounting device connectable to a U-shaped lift hitch when the power takeoff is disconnected from the tractor and wherein the drawbar mounting device includes a winch.

Another feature of the present invention is a drawbar and lift fork stand for storage and ready retrieval of implements such as drawbars and lift forks. Drawbars and lift forks are typically too massive for one man to lift and connect to a hitch. The stand allows the drawbars and lift forks to be connected and disconnected to the hitch without a lifting operation.

Another feature of the present invention is an improved automatic latching and locking mechanism that permits the connection of massive implements which are too heavy for a hitch with a three point hook arrangement. The improvement allows a massive load to be carried without sacrificing the quick release retractable features of the present lift hitch.

Another feature of the present invention is a retractable pallet fork that mounts on the lift hitch and swings inwardly and upwardly to an out of the way position. The retractability permits the pallet fork to remain connected to the lift hitch but in an out of the way position while other mounting devices are used.

DETAILED DESCRIPTION OF THE PREFERRED EMBODIMENT

Figure 1:
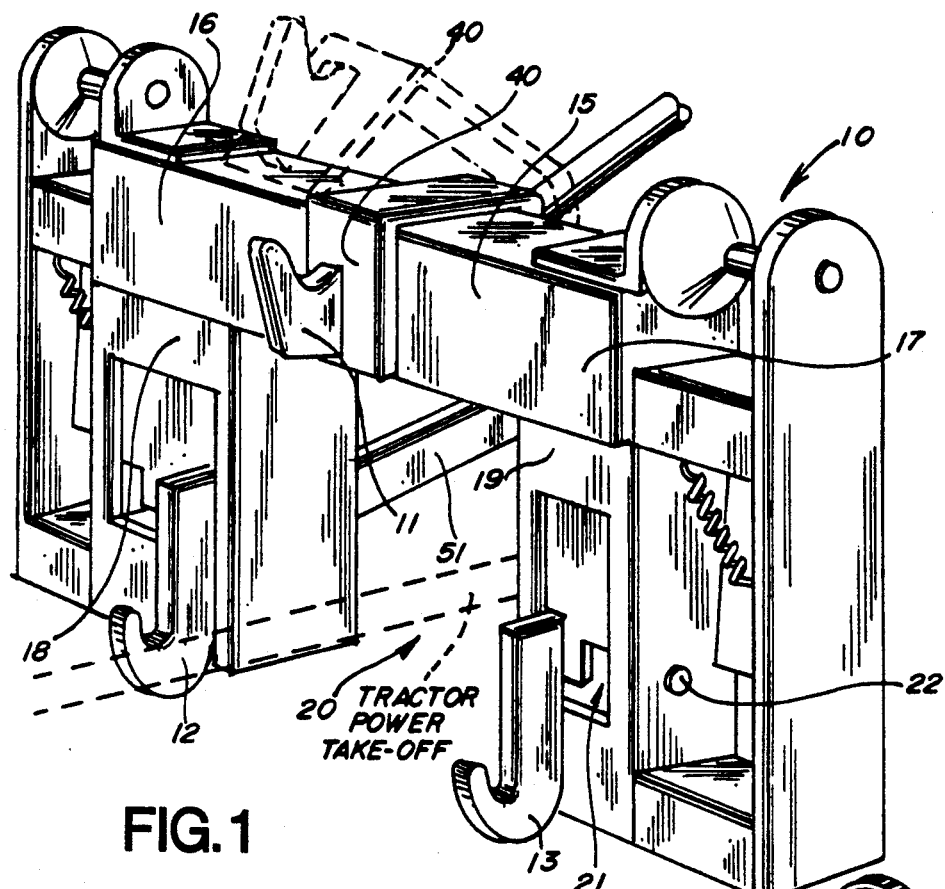
FIG. 1 is a rear perspective view of the inverted generally U-shaped lift hitch for allowing operation of the power takeoff of a tractor.
Figure 2:
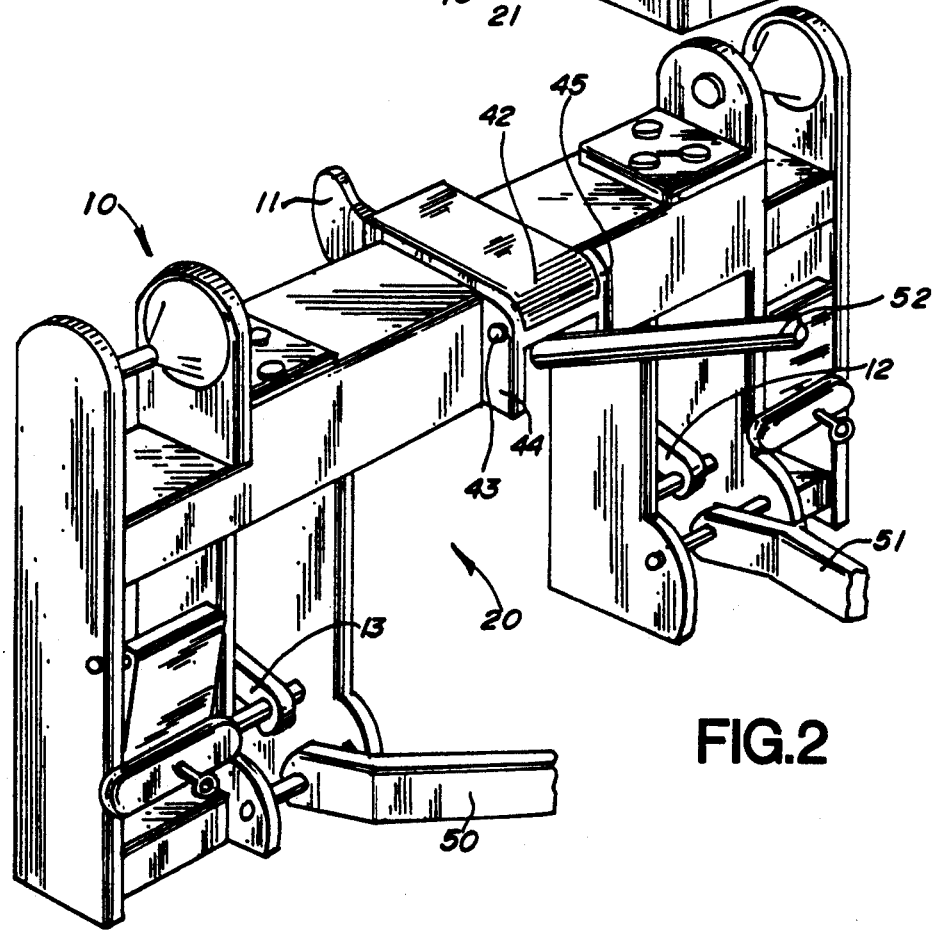
FIG. 2 is a front perspective view of the lift hitch shown in FIG. 1.

As shown in FIGS. 1 and 2, an inverted U-shaped, yoke like, interfacing lift hitch 10 includes a set of three retractable hooks 11, 12 and 13. The U-shaped lift hitch 10 includes a U-channelled top bar 15 having a pair of opposing ends 16, 17. A U-channelled interior side bar 18 is rigidly affixed to and extends downwardly from end 16. A U-channelled interior side bar 19 is rigidly affixed to and extends downwardly from end 17. Top bar 15 and side bars 18, 19 form a U-shaped opening 20 for a power takeoff of a tractor.

Figure 6:
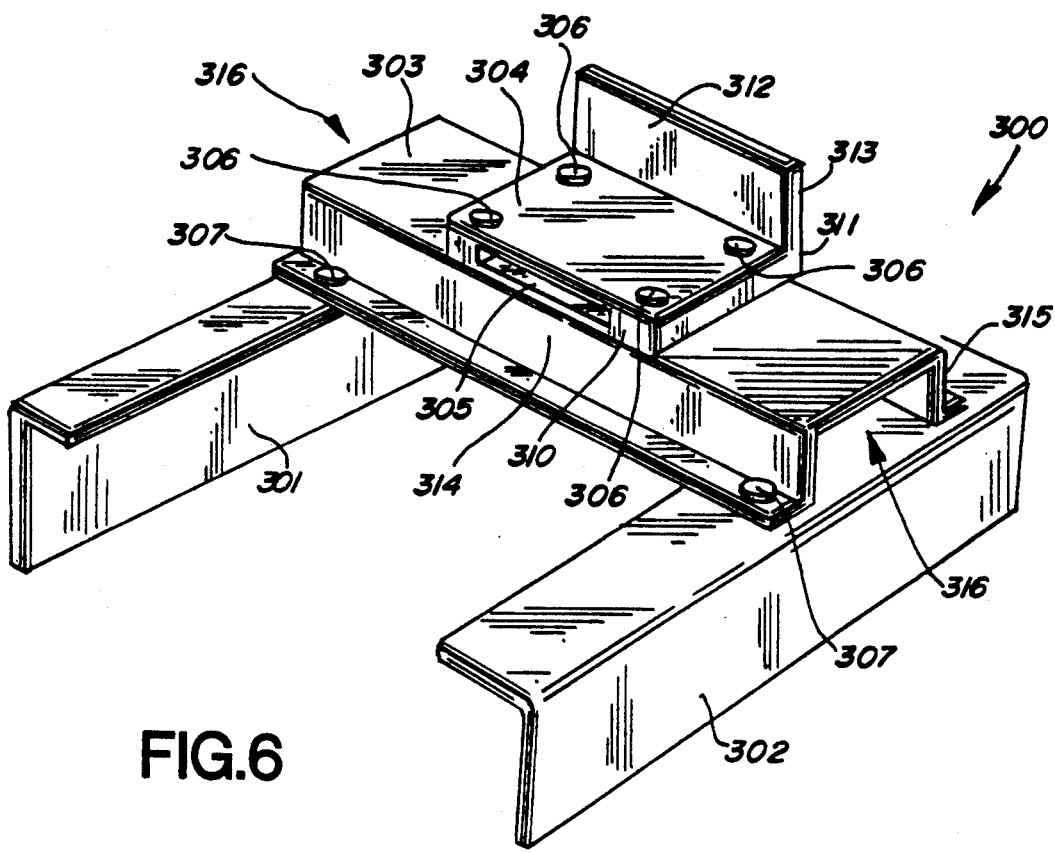
FIG. 6 is a front perspective view of a drawbar and lift fork stand.

As shown in FIGS. 1, 2, and 6, a rectangular opening 21 is formed in each of the bars 18, 19 for allowing the bottom hooks 1, 13 to be retracted into the bar 18, 19. Each of the hooks 12, 13 is removably connected to and pivots on a removable transverse pin 22 rotatably connected to each of the bars 18, 19.

Figure 3:
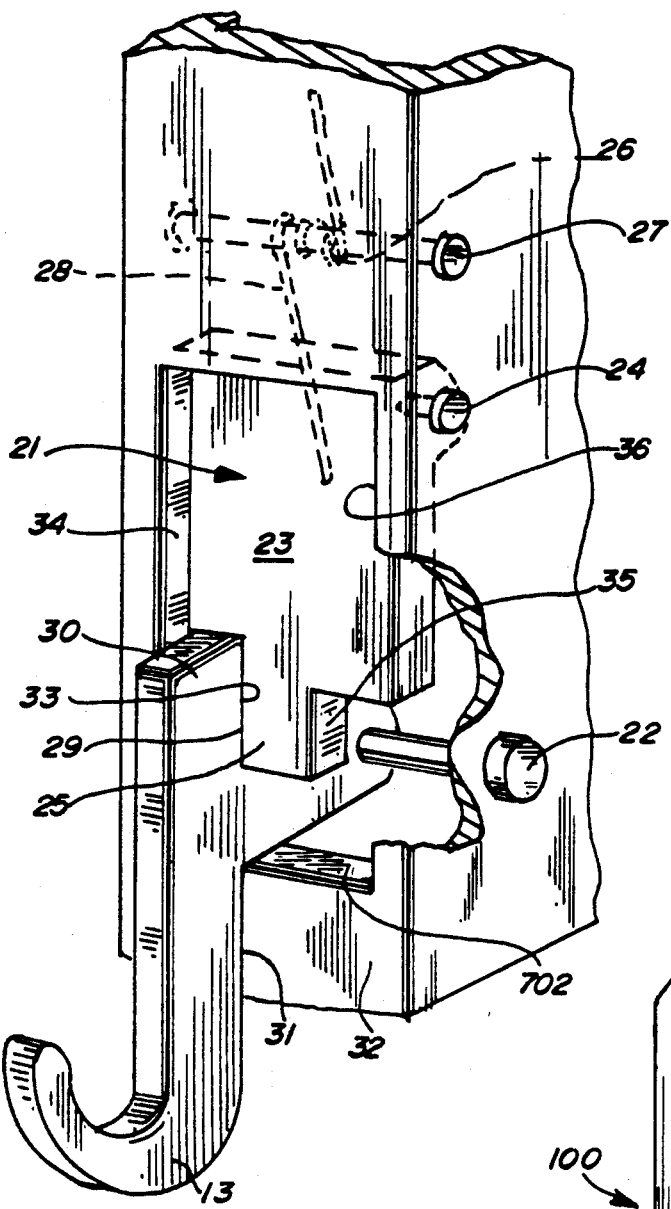
FIG. 3 is a detailed view of a locking bar for locking one of the lower hooks of the lift hitch as shown in FIG. 1.

As shown in FIG. 3, a hook lock or locking bar 23 is pivotally connected within each of the bars 18, 19 for locking the hooks 12, 13 to extended operating positions. Each hook lock 23 is pivotally connected to a respective removable transverse pin 24 which is rotatably connected to its respective bar 18 or 19. The hook lock 23 is substantially rectangular except for an integral downward central extension 25 for defining category 2 and 3 hitch configurations. A spring means 26 is affixed to a removable transverse pin 27 mounted in each of the bars 18, 19 and includes a downwardly extending leg 28 which is continuously urged against a rear face of the hook lock 23 to continuously urge the hook lock 23 forwardly and against an interior front section of each of the bars 18, 19 and against a rear edge 29 of an integral upright extension 30 of each of the hooks 12, 13. With each lock 23 continuously biased against each of the hooks 12, 13, a lower rear edge 31 of each of the hooks 12, 13 is urged against a face 32 of each of the bars 18, 19 so as to lock each of the hooks 12, 13 in a rigid extended operating position. A first vertical edge 33 of lock extension 25 and a first vertical edge 34 forming part of opening 21 clamps the upright extension 30 therebetween to limit transverse movement of each of the hooks 12, 13. A second vertical edge 35 of lock extension 25 and a second vertical edge 36 forming part of opening 21 serves to limit transverse movement of each of the hooks 12, 13 and to clamp each of the hooks 12, 13 in a different category hitch position. To retract each of the hooks 12, 13 or to allow the hooks 12, 13 to move transversely on each pin 22 into a category 3 hitch position from a category 2 hitch position, each hook lock 23 is retracted rearwardly and upwardly. Such a retraction operation may be facilitated by a tractor operated cord affixed to the rear face of each lock 23.

The clamping retractable top hook 11 clamps to a central portion of the top bar 15. A downwardly extending front portion 40 is integrally connected to a planar middle portion 41. The hook 11 is rigidly connected, such as by welding, to the front face of the front portion 40. A downwardly extending rear portion 42 is integrally connected to a rear end of the middle portion 41. The rear portion 42 of the top hook is pivotally connected by a transverse pin 43 affixed to and between a pair of ears 44, 45 rigidly connected to and extending rearwardly from a rear face 46 of the top bar 15. The hook 11 retractably pivots on pin 43.

The lift hitch 10 is connectable to a conventional three point hitch of a tractor wherein such a hitch may include lower booms 50, 51 and a top, central hydraulic cylinder and piston 52. Hence, a power takeoff of the tractor is operable through opening 20 for connection to an implement. The lift hitch 10 includes outer locking mechanisms rigidly affixed to upright support bars 17, 19 as described in my earlier filed and copending application Ser. No. 121,344 filed Nov. 16, 1987.

Figure 4:
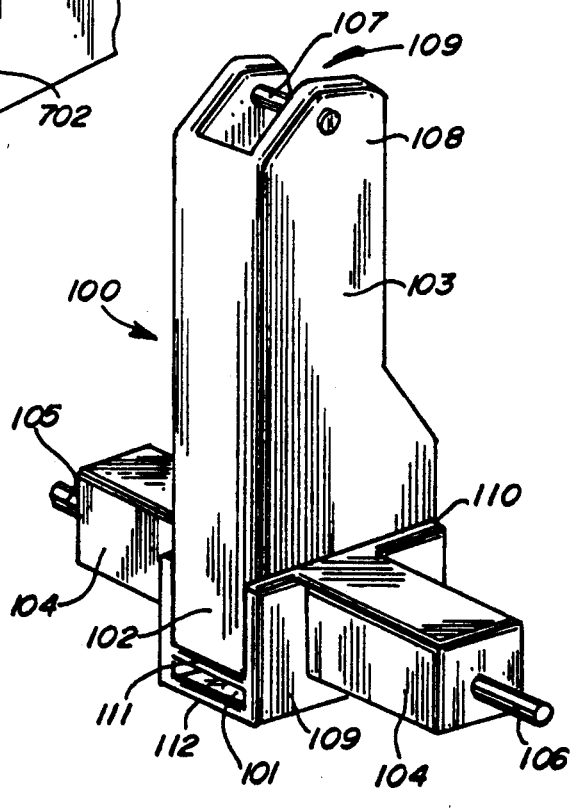
FIG. 4 is a front perspective view of a drawbar mounting device connectable to the lift hitch shown in FIG. 1.

As shown in FIG. 4, a drawbar mounting implement 100 has a longitudinal, elongate drawbar receiving slot 101 formed in a bottom end 102 of an upright central bar 103 for receiving and mounting a drawbar. The implement 100 is typically utilized in connection with the inverted U-shaped lift hitch 10 which lacks a connection for a drawbar. The bottom end 102 of the upright bar 103 is rigidly connected such as by welding to a transverse lower bar 104 having a pair of transverse open ended hitching pins 105, 106 set rigidly therein for connection to the bottom hooks of a quick hitch such as the inverted U-shaped lift hitch 10 with bottom hooks 12, 13 shown in FIG. 1. An upper transverse pin 107 is affixed in an upper end 108 of the bar 103. The bar 103 has an open rear face 109 so that the upper pin 107 is accessible for an upper hook of a quick hitch, such as the upper hook 11 of the lift hitch 10 shown in FIG. 1 and 2.

The elongate slot 101 runs from a front portion 109 of the bottom end 102 to a rear portion 110 of the bottom end 102. The slot 101 is disposed below the level of the bottom pins 105, 106 so that a drawbar is mounted close to the ground. A pair of respective upper and lower drawbar support plates 111, 112 forming part of the drawbar receiving slot 101 extend to the rear portion 110 of the bottom end 102. Drawbar pin apertures are formed in rear ends of the support plates 111, 112 for receiving a drawbar pin. The drawbar pin is inserted in the drawbar pin apertures and in an aperture formed in a rear end of a drawbar to maintain the drawbar in the drawbar mounting implement 100.

In operation, the drawbar mounting implement 100 is usually mounted on the inverted U-shaped lift hitch 10 when the power takeoff of the tractor is not being utilized. Pins 105, 106 are connected to the respective lower hooks 12, 13 of the hitch 10 and pin 107 is connected to upper hook 11 of hitch 10. Subsequently, a drawbar may be received in slot 101 for towing farm implements or performing other operations.

Figure 5:
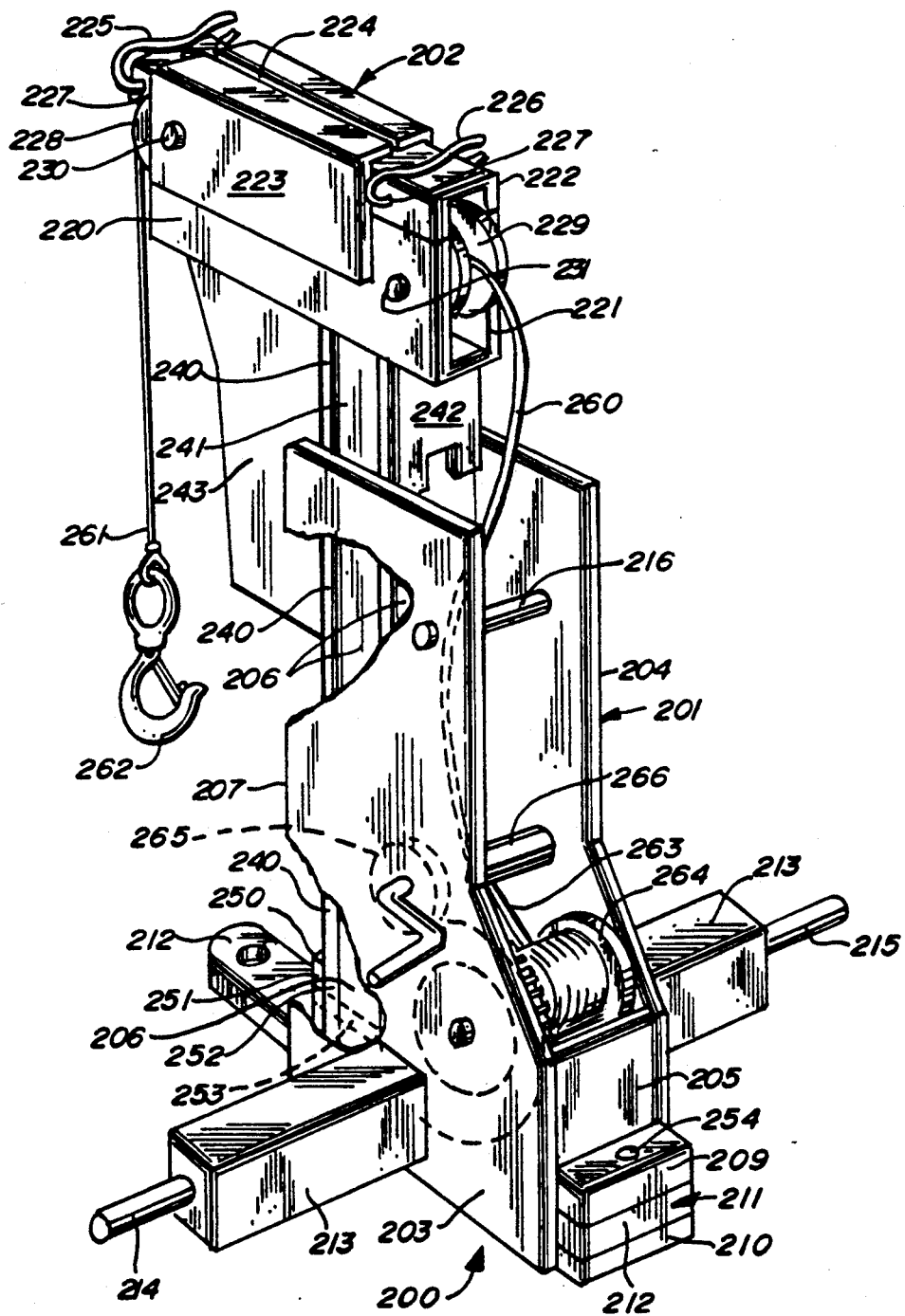
FIG. 5 is a rear perspective view of a winch mounted on a drawbar mounting device similar to the one shown in FIG. 4.

A winch and drawbar implement 200 is disclosed in FIG. 5 for attachment to a conventional three point hitch or to quick hitch such as the inverted U-shaped lift hitch 10 shown in FIG. 1. The winch and drawbar implement 200 has a drawbar mounting end 201, which is similar to the drawbar mounting implement 100 shown in FIG. 4, and a removable crane supporting end 202.

The drawbar mounting section 201 is formed by a pair of opposing parallel upright plates 203, 204 and a pair of opposing parallel upright supports 205, 206 rigidly affixed between the plates 203, 204. Support 206 is recessed in from a front portion 207 of plates 203, 204. A lower end 208 of the drawbar mounting section 201 includes a pair of respective upper and lower drawbar receiving longitudinal support members 209, 210 which are rigidly affixed between plates 203, 204 to form a drawbar receiving slot 211 therewith for receiving a drawbar 212. The lower end 208 also includes a transverse bar 213 rigidly affixed thereto. The bar 213 includes a pair of open ended transverse hitching pins 214, 215 for attachment to the lower pins of a quick hitch such as the lower pins 12, 13 of the U-shaped lift hitch 10 shown in FIG. 1. A top transverse hitching pin 216 is affixed between and to the plates 203 and 204 for attachment to a top hook of a quick hitch such as top hook 22 of lift hitch 10 shown in FIG. 1.

The removable crane supporting pulley end 202 includes a pulley housing 220 formed by a bottom U-shaped frame 221 and an interior, top, slidably removable, inverted U-channelled frame 222 which slides on top of the frame 221. An exterior, top, U-shaped cover 223 is rigidly affixed to and over the frame 221 and includes a longitudinally formed cable receiving slot 224. A pair of respective front and rear removable pins 225, 226 are insertable in a set of four apertures 227 formed in the slidable, removable, inverted, U-shaped frame 222. The pins 225, 226 prevent the slidable frame 222 from sliding out of the end 202. A pair of respective front and rear pulleys 228, 229 are mounted on a pair of respective pins 230, 231 affixed in the bottom U-shaped frame 221.

The pulley casing 220 is rigidly mounted on a front elongate upright bar 240, an abutting upright bar 241, and a rear upright bar 242. The bars 240, 241, and 242 are rigidly affixed together such as by welding. The bottom end of abutting bar 241 abuts the top end of bar 206. Elongate bar 240 extends down and abuts a front face of bar 206 and a front bottom portion of the rear bar 242 abuts a rear face of bar 206 so that the crane supporting and pulley end 202 is removably mounted on the drawbar mounting portion 201. It should be noted that the pulley casing 220 is rigidly mounted on a brace 243 which has a rear edge rigidly affixed to the front face of the elongate bar 240.

The drawbar 212 includes an upright member 250. The upright member 250 includes a pin receiving aperture 251. A pin is insertable in the aperture 251, an aperture 252 formed in the lower end of bar 240, and an aperture 253 formed in the lower end of bar 206. The pin clamps the pulley end or portion 202 to the drawbar mounting portion 201. A pin receiving rear aperture 254 is formed in the drawbar 212 and drawbar support plates 209 and 210 for receiving a pin for connecting the drawbar 212 to the drawbar mounting end 201. It should be noted that the pin insertable in pin receiving aperture 251 may be rigidly affixed to the upright member 250.

The winch and drawbar implement 200 includes a cable 260 with a distal end 261 connected to a fastener 262. A take-up end 263 of the cable 260 is connected to a take-up reel 264 which meshes with and is operated by a crank gear and handle 265. A crank pin 266 is rotatably affixed in the plates 203, 204. The cable 260 extends between the pins 216, 266 and the bar 206.

In operation, pins 214, 215 are connected to the lower hooks 12, 13 of the lift hitch 10. The upper hook 11 of the lift hitch is connected to the pin 216 of the winch implement 200. The drawbar 212 may then be connected to the implement 200 and thereto by a pin inserted in aperture 254. Subsequently, a trailer may be connected to and towed by the drawbar 212. Concurrently, the winch 200 may be operated to lift machinery into the trailer using the crane 262 and crank gear and handle 265.

If it is not desired to utilize the crane 262 or cable 260, the U-channel frame 222 is slid off the frame 221 to allow the cable 260 to be removed via the slot 224 and wound and stored about reel 264. Subsequently, the pulley portion 202, which includes pulley casing 220, may be separated from drawbar mounting portion 201.

As shown in FIG. 6, a drawbar or pallet fork or lift fork stand 300 includes a pair of legs 301, 302 affixed in a spacial relationship by a U-channelled crossbar 303. A drawbar receptacle 304 having a drawbar receiving slot 305 formed therein for receiving and holding a drawbar is centrally mounted on the crossbar 303 by a first plurality of removable bolt means 306. A second plurality of removable bolt means 307 affixes to the crossbar 303 to the legs 301, 302. The legs 301, 302, the crossbar 303, and the drawbar receptacle 304 may also be rigidly affixed together such as by welding.

The drawbar receiving slot 305 extends from a front edge 310 to a rear edge 311 of the drawbar receptacle 300. The receptacle 300 includes a pair of respective drawbar abutting front and rear faces 312, 313 for abutting an end of a drawbar. Crossbar 303 also includes a pair of respective drawbar abutting front and rear faces 314-315 for abutting an end of a drawbar.

In operation, the drawbar stand 300 is utilized when a drawbar or lift fork or pallet fork is excessively heavy or long for a one man operation to manually attach or detach the drawbar from a lift hitch such as the retractable lift hitch shown in FIG. 1. To attach a drawbar held by the drawbar stand 300 to a lift hitch, a tractor with a lift hitch is driven to approach one of the faces or edges 310, 311. The lift hitch is then raised by the tractor and maneuvered so that a drawbar receiving slot, such as slot 101 as shown in FIG. 4, slides about an end of a drawbar. Pins subsequently are inserted in the drawbar mounting implement and drawbar to affix the implement to the drawbar. To uncouple a drawbar from a lift hitch and insert the drawbar in the drawbar stand 300, a tractor is driven to approach one of the faces or edges 310, 311. As the tractor approaches the drawbar stand 300, the distal end of the drawbar may abut one of the faces 310, 311, 312, 313, 314, 315. The plurality of faces 310-315 allows the operator to gauge the relative location of the distal end of the drawbar. U-channelled cross bar member 303 also includes a second drawbar receiving slot 316 for receiving a drawbar or lift fork.

Figure 7:
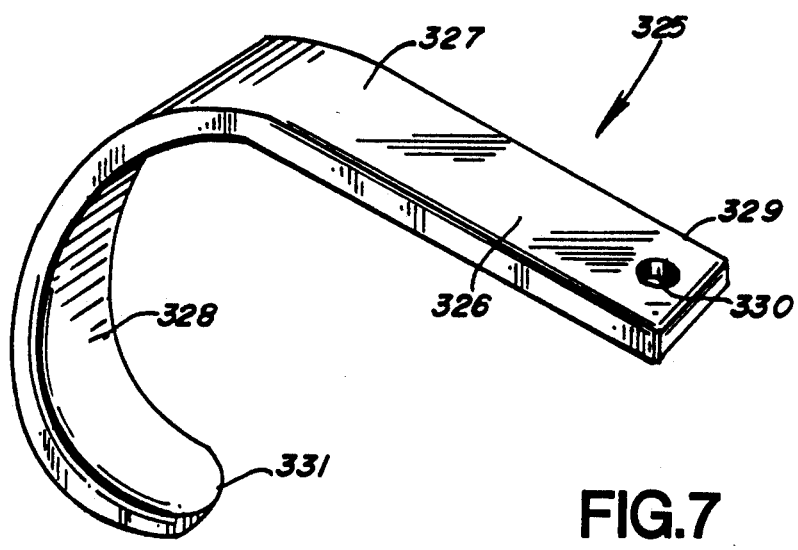
FIG. 7 is a perspective view of a stone pulling drawbar connectable to the drawbar mounting devices shown in FIGS. 4 and 5.

FIG. 7 shows a stone puller or stone pulling drawbar like implement 325. The stone puller 325 includes a substantially straight portion 326. An integrally connected first end 327 is integrally connected to a downwardly extending curved portion 328. A second end 329 includes a pin receiving aperture 330. The substantially straight portion 326 is insertable in, for instance, the drawbar receiving slot 101 of the drawbar mounting implement 100 shown in FIG. 4 or in the drawbar receiving slot 211 of the winch implement 200 shown in FIG. 5. The curved portion 328 includes a rounded end 331 and extends approximately 180 degrees from end 327 to the rounded end 331.

Figure 9:
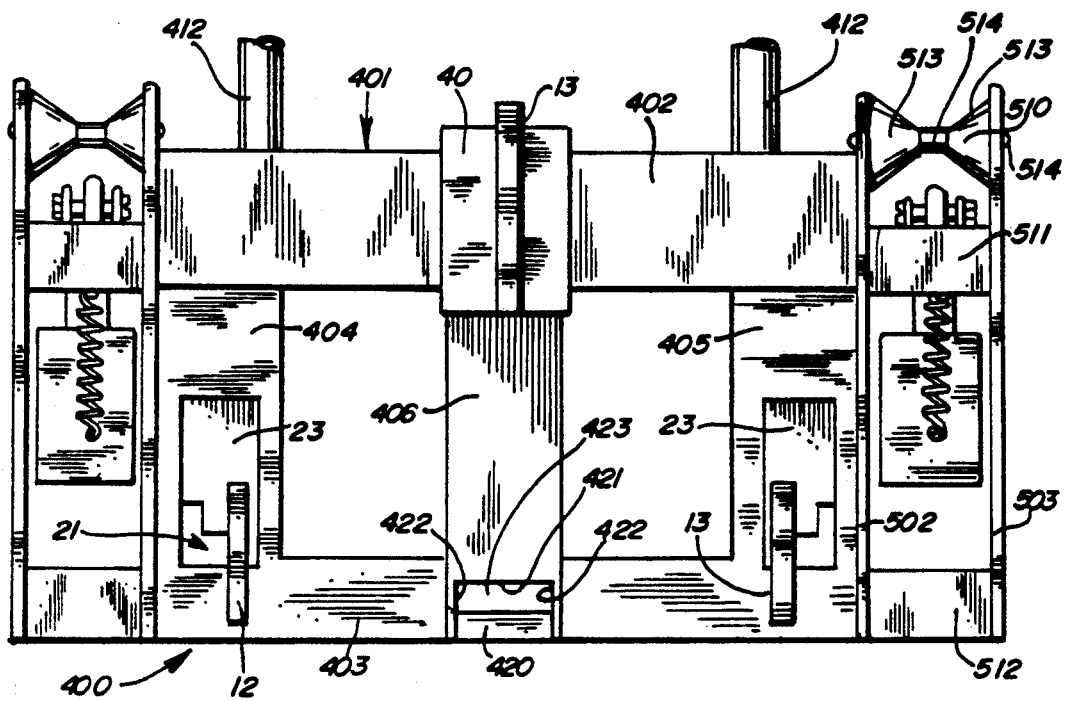
FIG. 9 is a rear perspective view of an interfacing lift hitch with a four point hitch mechanism.
Figure 10:
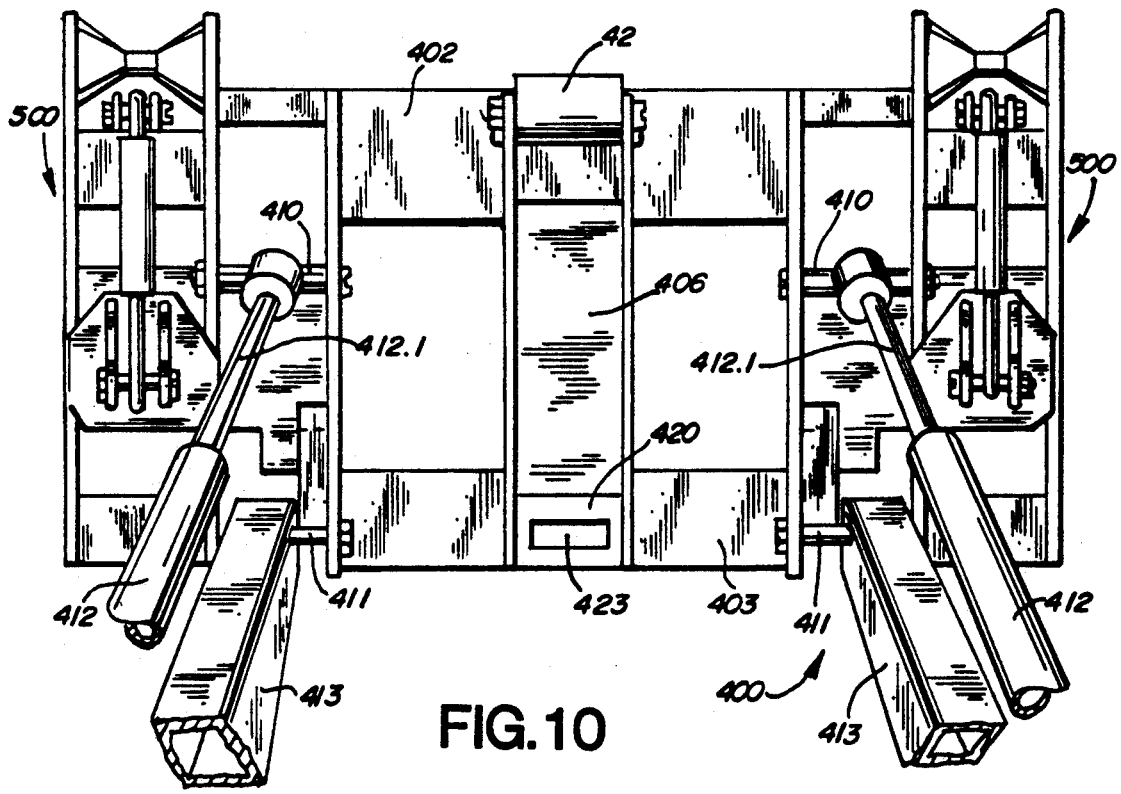
FIG. 10 is a front perspective view of the interfacing lift hitch and four point hitch mechanism shown in FIG. 9.

In operation, the stone puller 325 is affixed to the drawbar mounting implement 100, the winch implement 200, the lift hitch shown in FIGS. 9 and 10, or to a lift hitch disclosed in my earlier application Ser. No. 121,344 filed Nov. 16, 1987. Subsequently, the stone puller 325 is inserted behind a rock embedded in soil. A tractor or front end loader, to which the stone puller 325 is affixed, is then driven so as to pull the rock out of the soil. The stone puller 325 may also be utilized for breaking or ripping concrete or asphalt.

Figure 8:
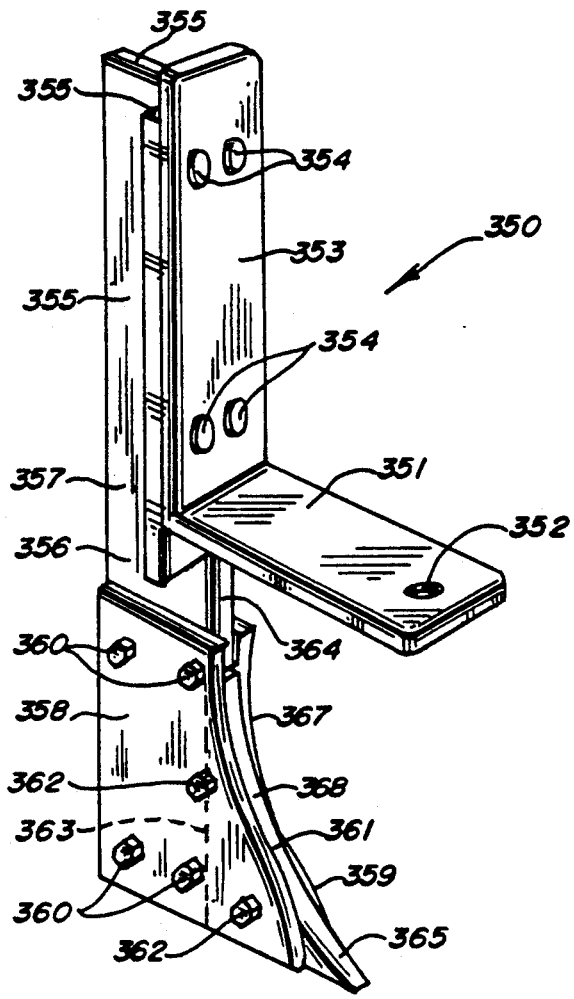
FIG. 8 is a perspective view of a deep tillage ripping drawbar connectable to the drawbar mounting devices of FIGS. 4 and 5.

A deep tillage ripper 350 is shown in FIG. 8. The ripper 350 includes a drawbar like extension 351 having a pin receiving aperture 352. The drawbar-like extension 351 is integrally connected to an upright bar 353 which is rigidly affixed by a plurality of bolts 354 to a T-bar 355.

An integral lower bar extension 356 extends downwardly from a lower end 357 of the T-bar 355. A pair of blade clamping members 358, 359 are clamped to each of the faces of the lower bar extension 356 by a plurality of bolt means 360.

A removable blade 361 is clamped between the blade clamping members 358, 359 by a pair of bolt means 362. A rear edge 363 of the blade 361 abuts a front edge 364 of the lower bar extension 356. Blade 361 includes a sharpened protruding point 365. Clamping members 358, 359 include a pair of respective curved edges 366, 367 which lie substantially flush with a front edge 368 of blade 361.

In operation, the deep tillage ripper 350 is connectable to the drawbar mounting implement 100, the winch implement 200, the lift hitch shown in FIGS. 9 and 10, or to a lift hitch disclosed in my earlier application. The drawbar like extension 351 is affixed, for instance, in the drawbar receiving slot 101 of drawbar mounting implement 100 or the drawbar receiving slot 211 of the winch implement 200. The ripper implement 350 is affixed to an implement such as implement 100 or 200 by a pin cooperating with aperture 352. Subsequently, the hitch to which the ripper implement 305 is affixed is lowered to drive the sharpened point 365 into the ground. The tractor and hitch are then driven forwardly to drive the blade 361 further into the ground to till the soil.

An interfacing lift hitch 400 for connection to a front loader is shown in FIGS. 9 and 10. The lift hitch 400 includes a generally rectangular, substantially integral and one-piece inner frame 401 having an upper U-channelled, support member 402, a lower, square tubular, support member 403 and a pair of respective side, U-channelled, support members 404, 405. The inner frame 401 includes a central, upright, U-channelled, support member 406 rigidly connected between upper and lower members 402, 403.

The U-channel support members 404, 405 include upper and lower removable, pivotable pins 410, 411 for being connected to respective upper and lower front end loader control extension arms 412, 413. Upper control extension arms 412 are typically hydraulic cylinders with linearly moveale pistons 412.1.

Each of the side, U-channelled, support members 404, 405 includes its respective lower hook 12, 13 and respective hook lock 23. The central, upright, U-channel support member 406 includes the upper retractable hook 11.

A drawbar receiving tubular support mount 420 is rigidly affixed in a lower section of the upright, U-channel support member 46. A lower edge 421 and a pair of side edges 422 also form part of the drawbar mount 420. A drawbar is receivable in drawbar slot 423 of the mount 420.

As shown in FIGS. 9, 10, 11A and 11B, an outer, automatic locking, four point hitch mechanism 500 for coupling massive implements is affixed on each side of the lift hitch 400. A cooperating latch 501 adaptable for direct connection to an implement such as by welding is shown in FIGS. 12A and 12B.

As shown in FIGS. 9-11B, each of the locking mechanisms 500 includes a pair of respective, inner and outer, spaced apart support plates 502, 503. Each of the inner plates 502 of each of the locking mechanisms is rigidly connected to the side, outer face of one of the upright, side support members 404, 405. The plates 502, 503 of each of the locking mechanisms 500 are spaced apart and connected by a set of three transverse coupling members 510, 511, 512. Transverse coupling member 510 includes a pair of hook guiding frustum portions 513 connected to plates 502, 503 and affixed with hook receiving pin 514. Transverse coupling member 511 includes a square tubular member 515 and a rearwardly extending fin 516 rigidly connected to the square tubular member 515. Transverse coupling member 512 is typically a square tube rigidly affixed between upright support member 502, 503.

A U-channel member 520 is pivotally affixed at one end to the fin 516 by pin connector 521. An opposing end 522 includes a pin receiving aperture 523 for receiving a locking pin.

A cylinder 530 is pivotally affixed to a central portion of the U-channelled portion 520 by a pin connector 531. The cylinder 530 is mounted between opposing sides of the U-channelled member 520. A coiled spring 532 is disposed in the cylinder 530. End 533 of the coiled spring 532 bears against the pin connector 531 and a second end 534 of the coil spring bear against one end 535 of a piston 536 slidable in the cylinder 530. The piston 535 is pivotally affixed at a second end 537 via a pin connector 537.1 to a U-channelled fin 538 rigidly affixed to a pivotable locking bar 539. The bar 539 is pivotally affixed by a pin connector 540 to and between upright support members 502, 503. A coil spring 541 is connected between transverse support member 515 and the locking bar 539 to continuously urge the locking bar 539 forwardly. Each side of the U-channelled fin 538 includes an aperture 542 which is alignable with apertures 523 formed in each side of U-channelled lever 520.

The coupling counterpart 501 which is typically adaptable for connection to a farm implement includes an inverted hook 550 rigidly connected to a top portion of an implement such as a lift fork or pallet fork 551 as shown in FIG. 12A. A pivotable clawed latch 552 with a rear claw 552.2 and a front caw 552.3 is pivotally affixed to a U-channelled member 553 by a pin connector 554. The U-channel member 554 is in turn rigidly affixed to a bottom portion of an implement such as the lift fork 551. A torsion spring 555 is wound about and affixed to the pin connector 554 and continuously urges the clawed latch 552 to an upright, unlatched position by one end 551.1 bearing against a front portion of the clawed latch 552 and by a second end 555.2 bearing against U-channelled member 553. Claws 552.2, 552.3 may be shorter than disclosed in my earlier filed application. Furthermore, front claw 552.3 may be oblique and angles downwardly and toward the tractor so as to readily engage and disengage the square-like bottom bar 512 and its front plate 512.2. Furthermore, it should be noted that the distance between claws 552.2, 552.3 is slightly greater than the width of bar 512 so that the clawed latch 552 rides on three sides of the transverse bar 512 but is easily pivotable off the transverse bar 512. When coupled, rear claw 552.2 bears most of the load of an implement.

A pair of wedgable ears 560, 561 are rigidly connected to and extend frontwardly from the lift fork 551 on each side of the clawed latch 552. The ears 560, 561 extend toward each other and include a pair of respective outer, rear edges 562, 563 which are spaced from each other at a distance slightly greater than the distance between the inner faces of upright support member 502, 503 so that the ears are frictionally slidable or wedgable between and frictionally engagable with or wedgable in the upright support members 502, 503.

A pair of triangular, shim, abutment members 570, 571 are rigidly affixed to a bottom portion of an implement such as the lift fork 551. A downwardly and frontwardly extending abutment edge 572 of each of the triangular members 570, 571 bears against the front edges of the support members 502, 503 when the coupling 501 is connected to its coupling counterpart 500 so as to provide a tight, snug coupling relationship with little transverse or lateral movement between coupler 501 and hitch mechanism 500. The shim or abutment members 570, 571 also dispose the implement 551 in a desired orientation relative the lift hitch 400. It should be noted that the clawed latch 552 may be mounted on bar-like tapered shims disposed between the claw latch 552 and the implement 551.

In operation, to couple an implement such as the lift fork 551 to the lift hitch 400, the hydraulic cylinders 412 of a front end loader are extended to tilt the top portion of the lift hitch 400 downwardly toward the lift fork 551 until the hook receiving pins 514 are disposed underneath their respect hooks 550. Subsequently, the lift hitch 400 is lifted upwardly in its canted position to insert the pins 514 in the inverted hooks 550. As the hooks 550 receive the pins 514, the pistons 412.1 of the hydraulic cylinders 412 are retracted to return the lift hitch 400 to an upright position. As the lift hitch returns to or slightly past an upright position, the weight of the implement 551 forces the clawed latched 552 to bear against a front portion 551 of the locking plate 539.2. As the clawed latch 552 bears against the locking bar 539 and forces the locking bar 539 to pivot upwardly and toward, the tractor, the weight of the implement forces the claws 552.2, 552.3 of each of the latches 552 about the respective sides 512.1, 512.2 of the bottom transverse bar 512. The locking bar 539, which is continuously urged toward the implement by coil spring 541, slips onto an upper surface portion 552.4 of the latch 552, thereby locking the clawed latch 552 to the bottom transverse bar 512. With the embodiment shown in FIG. 12A, the ear like wedges 562, 563 are frictionally wedged between the interfaces of the upright support members 502, 503 as the clawed latch 552 pivots to grab the bottom transverse bar 512. The wedges 562, 563 limit transverse or lateral movement of the coupling counterpart 501 relative the lift hitch 400. The triangular, shim, abutment members 570, 571 serve as stops to dispose the implement 551 relative the lift hitch 40 in a desired orientation. After the clawed latch 552 is attached about the transverse bar 512 and the locking bar 539 has slipped on to the clawed latch 552, the end 522 of the locking lever 520 is pushed downwardly to compress the coil spring 532 and slide the cylinder 530 down the piston 536. As the lever 520 approaches a parallel orientation relative the cylinder 530 and piston 536, an over-center point is attained so as to lock the lever 520 in a substantially parallel relationship with the cylinder 530 and piston 536 and thus lock the locking bar 536 over the clawed latch 552. To assure a locked relationship between lever 520 and bar 539, a pin may be inserted in cooperating apertures 523, 524.

To uncouple an implement from the lift hitch 400, the locking lever 520 is pulled through the over-center point such as by a control line affixed between end 552 of the lever 520 and the tractor, which may operate and pull in the line. After the locking lever 520 moves through the over-center point, the coil spring 532 extends to urge and pivot the lever 520 upwardly until slack is produced between lever 520, cylinder 530, piston 536 and locking bar 539. Subsequently, the hydraulic cylinders 412 of the front end loader are extended to tilt the top portion of the lift hitch 400 downwardly and away from the tractor. During such a tilting, the control line 524 is drawn in to pivot the locking bar 539 upwardly and off of the clawed latch 552 so that the weight of the implement 551 urges the clawed latch 552 to pivot off of the transverse bar 512. After the clawed latch 552 is released, the lift hitch 400 is lowered in its canted position to slide the pin 514 down and out of the inverted hook 550.

Figure 11A:
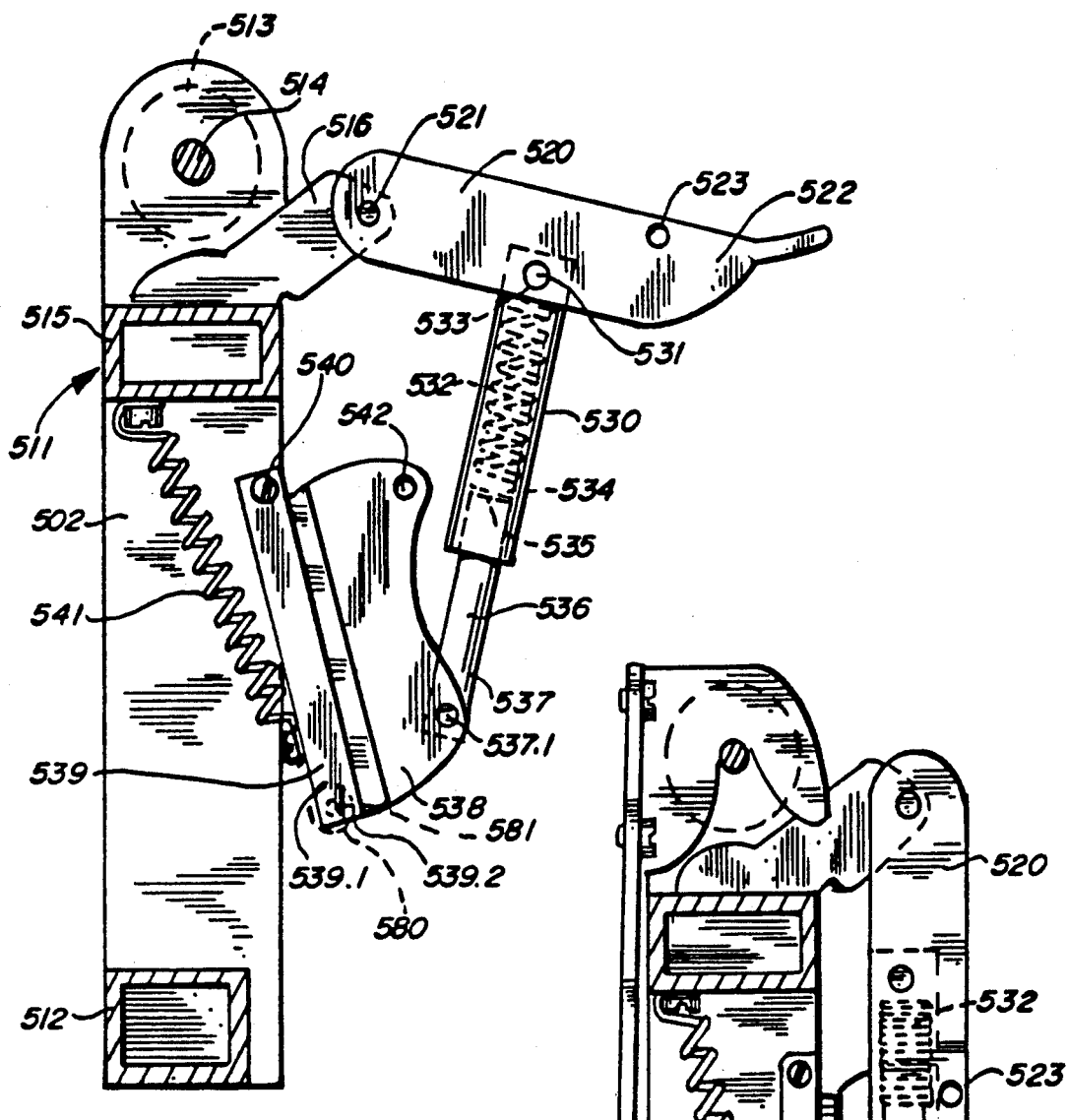
FIG. 11A is a detail elevation view of a portion of the four point hitch mechanism of the lift hitch of FIG. 9 with the hitch mechanism shown in an open orientation.
Figure 11B:
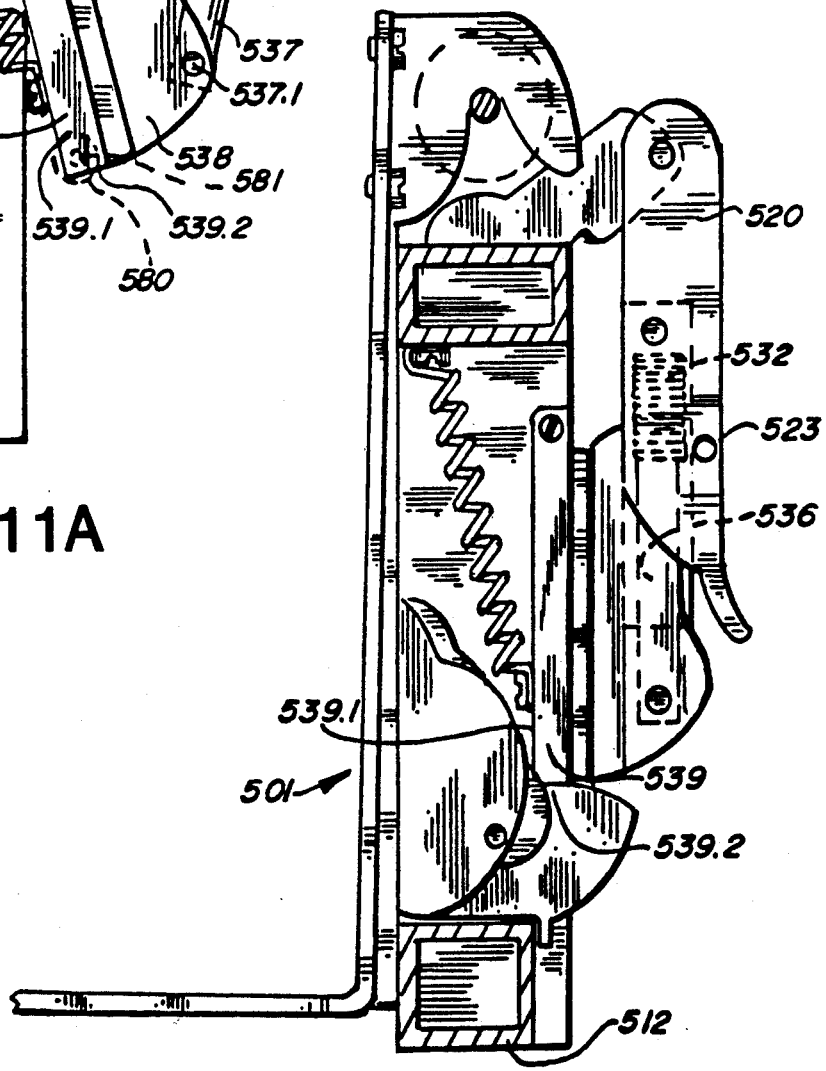
FIG. 11B is a detail elevation view of the hitch mechanism of FIG. 11A in a locked orientation.
Figure 12A:
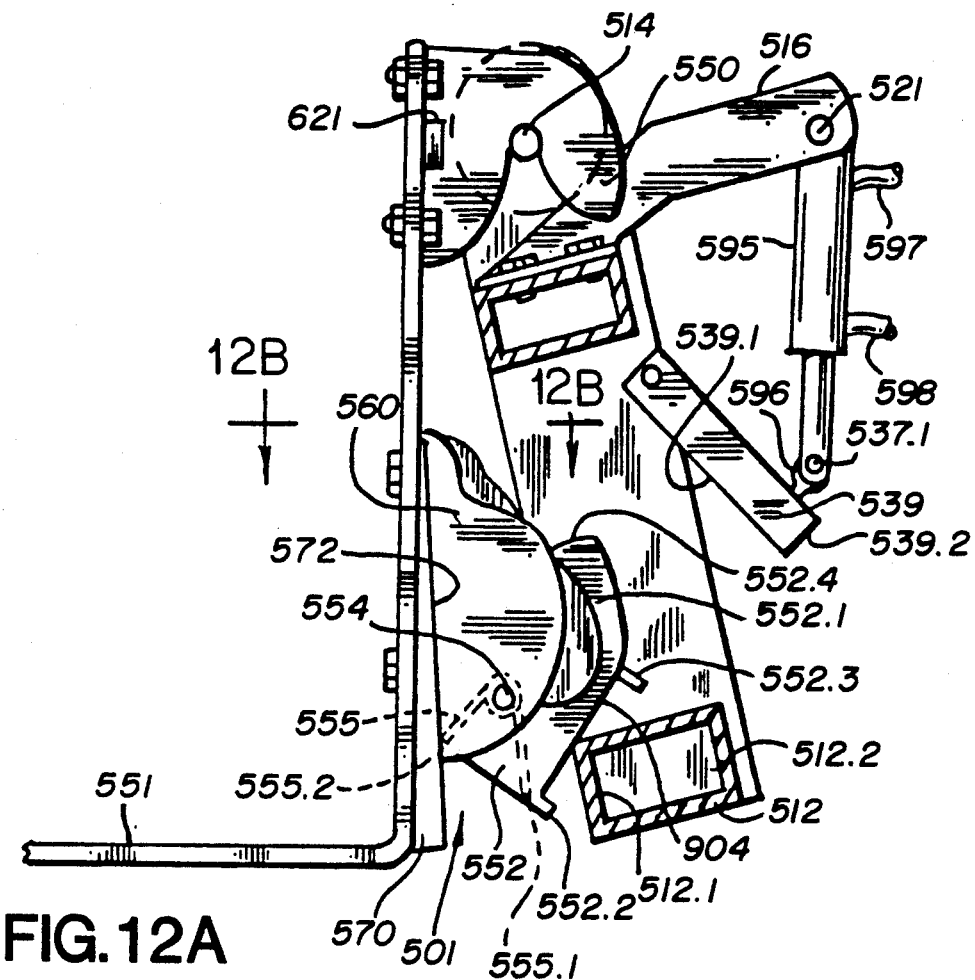
FIG. 12A is a detail elevation view of an alternate embodiment of the four point hitch mechanism.
Figure 12B:
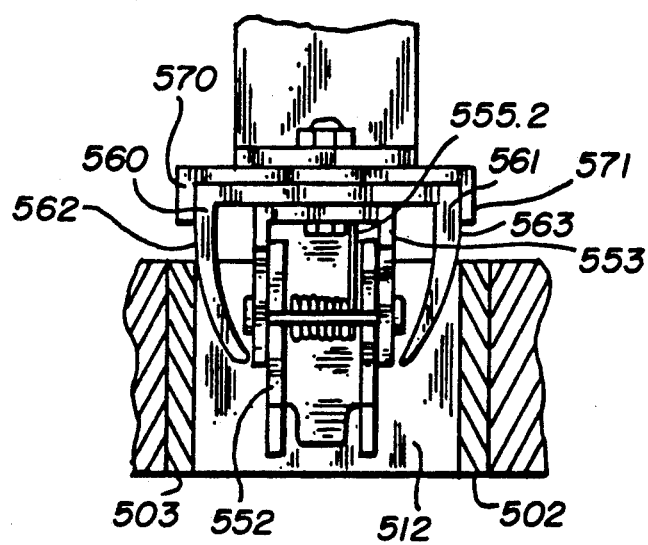
FIG. 12B is a section view at lines 12B—12B of FIG. 12A.

It should be noted that, as shown in FIG. 11A, a pair of rollers 580 may be rotatably affixed to bottom side portions of bar 539 by a pin 581. The pin 581 may be received in an aperture formed in the bar 539. Each roller 580 bears against the upper surface 552.4 of the latch 552. Such a roller 580 may provide a more efficient pressure bearing relationship between locking plate 539 and clawed latch 552.

It should be noted that instead of the compression spring 532, cylinder 530 and piston 536, a hydraulic cylinder 595 with fluid lines 597, 598 may be provided and connected between apertures 537.1 and 521. The hydraulic cylinder 595 may be pivotally connected to fin 515 at pin connector 521 and to a fin 596 affixed to bar 539 via pin connector 537.1. With such a hydraulic cylinder, lever 520 is excluded.

Figure 13:
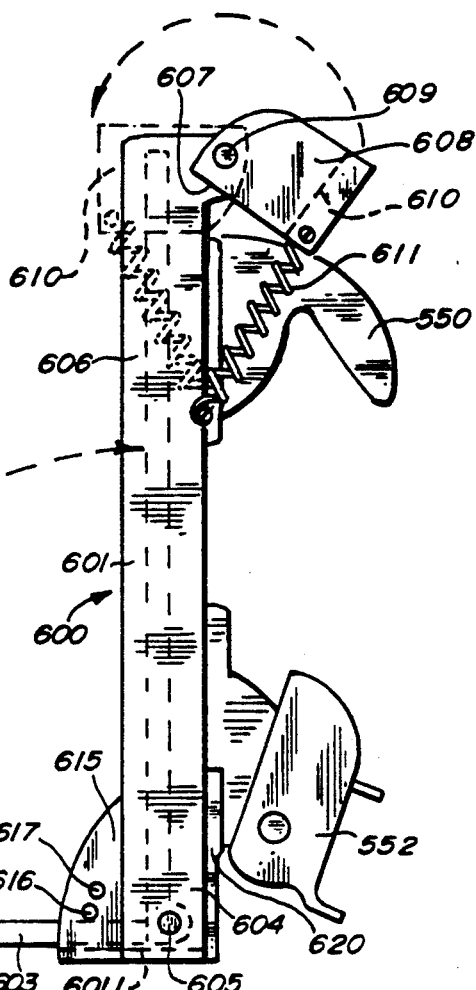
FIG. 13 is a side elevation view of a retractable lift fork connectable to the four point hitch mechanism shown in FIGS. 9 and 10.

As shown by FIG. 13, the present invention includes a retractable or fold up, lift or pallet fork implement 600 adaptable for connection to a pivotable clawed latch 552 and inverted hook 550 and hence connectable to one of the outer locking mechanisms 500. The lift fork 600 includes an upright U-channelled piece 601 with a floor 601.1 and a pivotable, retractable lift fork 602 pivotally affixed at a first end 603 to a bottom end 604 of the U-channelled 601 by a pin connector 605.

A top end 606 of the U-channelled member 601 includes a frontwardly extending fin 607. A lift fork retaining, pivotable, U-channelled cap 608 is pivotally connected to the fin 607 by a pin connector 609. The cap 608 includes a lift fork retaining plate 610.

One end of a coil spring 611 is affixed to a side plate of the U-channelled cap 608 and the other end of the coil spring 611 is affixed to a central front portion of one of the side plates of the U-channelled member 601.

The bottom flange 615 extends from each of the side plates of the bottom end 604 of the U-channel 601 and is affixed to the floor 601.1. Each of the flanges 615 includes a pair of respective pin receiving apertures 616, 617. A pin connected in one of the apertures 616, 617 may serve as a retainer so that a drawbar may be carried in an upright position in the U-channelled piece 601 between the cap 608, floor 601.1 and the flanges 615. Both a drawbar and the retractable lift fork 602 may be carried in the U-channel upright member 601.

A bottom portion of the front face of the U-channel 601 may include a pair of spaced apart bars or bumper plates 620 to bear against the front face of the lift hitch 400 such as the upright supports 502, 503. The spaced apart bars or bumper plates 620 provide a more secure fit for the coupling 501 relative the hitch 400 by limiting movement therebetween and absorbing vibrations. Upper plate 620 may be formed of a resilient or pliable material. It should further be noted that a second pair of resilient or pliable bumper plates 621 may be affixed to coupler 501 near the inverted U-shaped 550 to provide a snug fit between upper portions of the hitch 400 and implement and absorb vibrations created therebetween.

Figure 14:
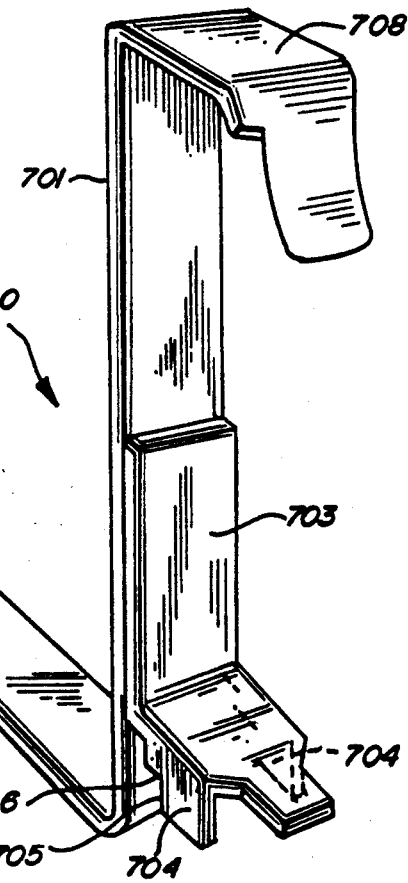
FIG. 14 is a perspective view of a lift fork connectable to the lift hitch of FIG. 1 or FIG. 9.

In operation, the lift fork implement 600 is connectable to the outer locking mechanism 500. After the lift fork 602 has been deployed and utilized the in the field, it may be desirable to retract lift fork 602 to, for instance, utilize the retractable hooks 11, 12, 13. To retract the lift fork 602, the pin 616 is removed and the fork 602 is swung upwardly and toward the tractor and into the U-channel 601. Subsequently, the retaining cap 608 is pivoted over the top end 606 of the U-channel 601 so that the outward end 602.1 of the fork 602 is disposed in the U-channel 601 between the front panel of the U-channel 601 and the plate 610 of the retaining cap 608. Hence the lift fork 602 is oriented in an out of the way position to allow operation of, for instance, the hooks 11, 12, 13. As shown in FIG. 14, a lift fork implement 700 includes an upright bar 701 integrally connected at approximately a right angle to lift fork 702. An angle iron 703 is rigidly affixed to a lower, front portion of the upright bar 701. The angle iron 703 includes a pair of downwardly extending locks 704 with abutting edges 705, 706. An inverted U-shaped hook 708 is integrally connected to the top end of the upright bar 701.

In operation, the lift fork implement 700 is connectable in each of the rectangular openings 21 shown in FIGS. 1-3, and 9-10 when the respective bottom hook 12 or 13 is retracted. To couple one of the hitches 10 or 400 to the lift fork implement 700, the hitch 10 or 400 is pushed into the lock 704 so that the rectangular opening 21 receives the lock 704 so that the top bar 15 or 402 is disposed under the U-shaped lock 708. Subsequently, hitch 10 or 400 is raised so that the abutment edges 705, 706 and a bottom, front face of top bar 701 bear against and abut a top portion 702 of upright supports 18, 19 or the equivalent bar portion in hitch 400. The lift fork implement 700 is then ready for lifting operations. To uncouple the implement 700, the procedure is simply reversed.

Figure 15A:
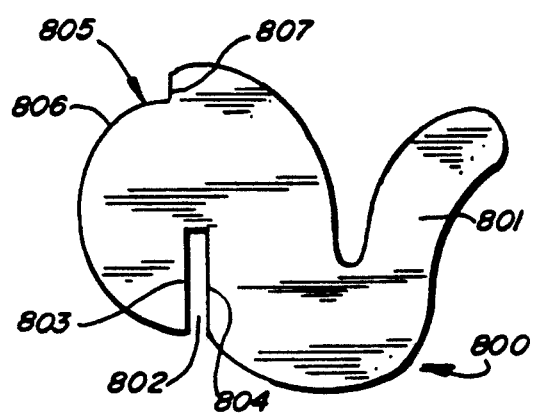
FIG. 15A shows an alternate top hook embodiment.
Figure 15B:
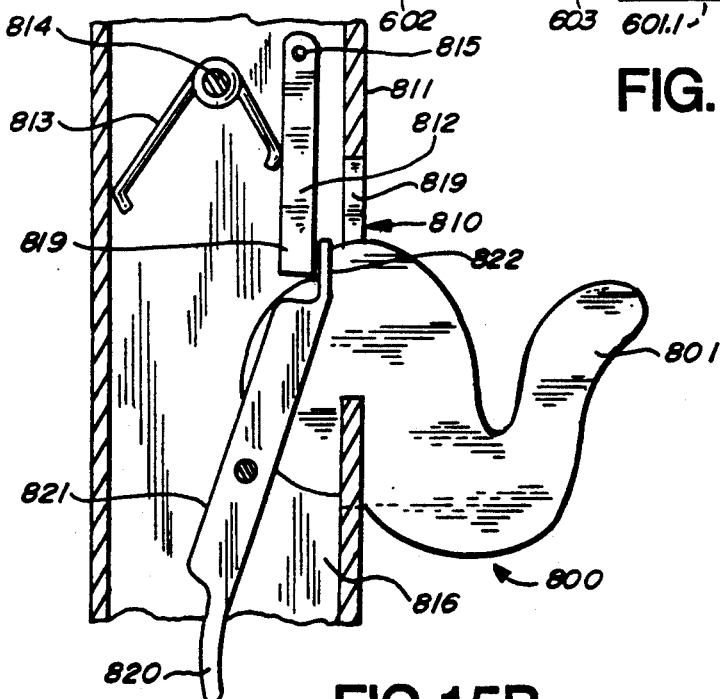
FIG. 15B shows the alternate hook of FIG. 15A connected to a portion of a hitch.

As shown in FIGS. 15A and 15B, a removable top or bottom hook 800 includes a hook portion 801 and a plate receiving slot 802 formed by plate abutting edges 803, 804. An indent 805 is formed by a curved edge 806 and a straight edge 807. A hook receiving opening 810 may be formed in a front plate 811 of a top or upright support bar, such as top bar 15 of hitch 10. A transverse locking bar 812 is biased so as to be continuously urged toward an inside face of side plate 811 by a spring means 813 affixed to a pin 814. The transverse locking bar 812 is pivotally affixed between a pair of side plates 816, which may be affixed in a top bar, such as top bar 15, or which may have U-channeled upright supports similar to the upright supports 18 and 19 of hitch 10 in FIGS. 1 and 2.

In operation, hook 800 is inserted into the slot 810 so that the curved edge 806 bears against and forces the biased bar 812 away from plate 811. Simultaneously, the slot 802 of the hook 800 may be slid downwardly about the side plate 811 until a bottom portion 819 of the bar 812 is urged against and snaps against the intersection of curved edge 806 and straight edge 807 of the hook 800.

To uncouple the hook 800 from the plate 811 the locking bar 812 is pulled away from the indent 805 such as by a control line affixed to a bottom portion 820 of a lever pivotally affixed between side plates 816. The hook 800 is then slipped off the plate 811 as a top portion 822 of the lever 821 bears against portion 819 of the bar 812 and pivots bar 812 away from front plate 811.

Figure 16A:
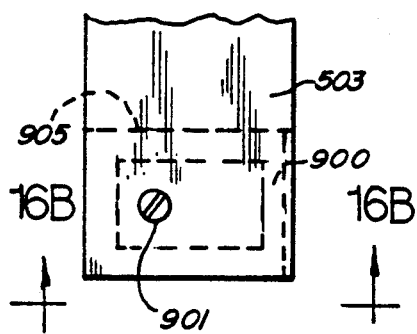
FIG. 16A shows an alternate embodiment of a portion of the four point hitch mechanism.
Figure 16B:
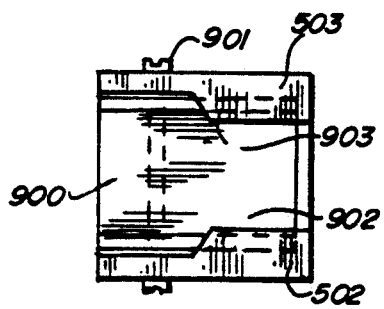
FIG. 16B shows a bottom plan view of FIG. 16A.

As shown in FIGS. 16A and 16B, an alternate embodiment of the bottom transverse bar 512 of FIGS. 9-12 includes a pivotable transverse block 900. The block 900 is pivotally connected between upright supports 502, 503 by a pin connector 901. Upright supports 502, 503 include a pair of respective inwardly extending stops 902, 903 to preclude excessive rotation or pivoting of block 900. Pivoting of block 900 allows an easier clamping and removal of claw 552 relative the block 900. For instance, as a bottom portion 904 of the latch 552 bears against block 900, the block 900 pivots so that an upper face 905 moves into a parallel, abutting relationship with portion 904. As the implement 551 is urged further into the hitch 400, the latch 552 an block 900 pivot simultaneously in the same direction, but in the opposite direction as the original pivoting motion of block 900. Subsequently, locking bar 539 snaps into and against edge 552.4 to lock the latch 552 to the block 900 and hitch 400.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A four point hitch having a frame and being connectable to a mobile machine, and for connecting an implement relative to the mobile machine, comprising:
   a pair of inverted hooks adaptable for connection to the implement, the hooks extending from the implement,
   a pair of transverse pins affixed to the frame of the lift hitch, the pins engageable with the inverted hooks,
   a pair of pivoting latches adaptable for connection to the implement, each of the latches having a pair of respective front and rear projections,
   a pair of transverse bars affixed to the frame for engaging the latches, each of the bars having opposite sides, the projections engaging respective opposing sides, and
   releasable locking means connected to the frame for releasably locking the latches to their respective bars and preventing pivotal movement of the latches relative to their respective bars whereby the lift hitch is lifted upwardly to drive the pins up and into the inverted hooks, the top end of the frame then being tilted toward the mobile machine so that the weight of the implement drives the latches into the frame and about the transverse bars, the releasable locking means subsequently bringing pressure to bear on the latches to attach the implement to the lift hitch.

2. The lift hitch of claim 1, wherein the releasable locking means includes a pair of rigid members swingingly affixed to the frame and being biased toward the front end of the frame, each of the rigid members including an end for engaging and preventing pivotal movement of each of the latches whereby when each of the latches moves into the frame and engages and pivots about its transverse bar, each of the latches engages its respective rigid member, each of which consequently swings back toward the tractor until each of the rigid members swings and clips over the upper surface portion of its respective latch to prevent pivotal movement of its respective latch.

3. The lift hitch of claim 1, and further comprising a pair of wedgable ears, each of the ears adaptable to be rigidly affixed to an implement so as to extend on either side of each of the latches, the ears being wedgable into the frame to limit transverse and lateral movement of its respective latch relative the frame.

4. The lift hitch of claim 1, and further comprising a pair of resilient bumper pads, each of the pads adaptable to be rigidly affixed to an implement adjacent the latches, the bumper pads being engagable against the frame so as to reduce vibrations transmittable between the implement and the lift hitch.

5. The lift hitch of claim 2, wherein the releasable locking means includes a spring compression means connected between each of the rigid members and the frame for locking each of the rigid members against its respective latch.

6. The lift hitch of claim 2, wherein the releasable locking means includes a hydraulic cylinder connected between each of the rigid members and the frame for locking each of the rigid members against its respective latch.

7. The lift hitch of claim 1, wherein the transverse bars are generally square in section.

8. The lift hitch of claim 1, wherein each of the transverse bars comprises a pivotable block.

* * * * *

UNITED STATES PATENT AND TRADEMARK OFFICE
CERTIFICATE OF CORRECTION

PATENT NO. : 5,169,279
DATED : December 8, 1992
INVENTOR(S) : Emil F. Zimmerman

It is certified that error appears in the above-identified patent and that said Letters Patent is hereby corrected as shown below:

In column 11, line 66, delete "an" and insert --and--.

On the title page, item (54) in the title;

please delete "INTERFACTING LIFT HITCH" and substitute --INTERFACING LIFT HITCH--.

Signed and Sealed this

Twenty-first Day of December, 1993

Attest:

BRUCE LEHMAN

Attesting Officer     Commissioner of Patents and Trademarks